United States Patent
Lee et al.

(12)

(10) Patent No.: US 10,295,723 B1
(45) Date of Patent: May 21, 2019

(54) 2D PUPIL EXPANDER USING HOLOGRAPHIC BRAGG GRATING

(71) Applicant: Facebook Technologies, LLC, Menlo Park, CA (US)

(72) Inventors: Hee Yoon Lee, Bellevue, WA (US); Wanli Chi, Sammamish, WA (US); Pasi Saarikko, Kirland, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 15/968,576

(22) Filed: May 1, 2018

(51) Int. Cl.
- *G02B 6/00* (2006.01)
- *F21V 8/00* (2006.01)
- *G02B 27/01* (2006.01)

(52) U.S. Cl.
CPC ......... *G02B 6/0038* (2013.01); *G02B 6/0016* (2013.01); *G02B 6/0065* (2013.01); *G02B 27/0172* (2013.01); *G02B 2027/0112* (2013.01); *G02B 2027/0125* (2013.01); *G02B 2027/0174* (2013.01)

(58) Field of Classification Search
CPC .. G02B 6/0038; G02B 6/0016; G02B 6/0065; G02B 27/0172; G02B 2027/0112; G02B 2027/0125; G02B 2027/0174

USPC ........................................................... 385/36
See application file for complete search history.

(56) References Cited

U.S. PATENT DOCUMENTS

| | | | | |
|---|---|---|---|---|
| 8,659,826 | B1* | 2/2014 | Brown | G02B 5/18 |
| | | | | 359/402 |
| 2009/0074356 | A1* | 3/2009 | Sanchez | G02B 6/005 |
| | | | | 385/31 |
| 2013/0250207 | A1* | 9/2013 | Bohn | G02B 6/00 |
| | | | | 349/61 |
| 2015/0235460 | A1* | 8/2015 | Schowengerdt | G06T 19/006 |
| | | | | 345/633 |
| 2018/0088325 | A1* | 3/2018 | Brown | G02B 27/0101 |
| 2018/0149791 | A1* | 5/2018 | Urness | G02B 6/0028 |

\* cited by examiner

*Primary Examiner* — Jerry M Blevins
(74) *Attorney, Agent, or Firm* — Kilpatrick Townsend & Stockton LLP

(57) ABSTRACT

A holographic Bragg grating is used as an output element for a waveguide in a lens used for artificial reality. By using a Bragg grating, a number of waveguides can be reduced. The output element has a first super grating and a second super grating written in a single grating layer of the waveguide. The first super grating has a grating vector that is skew to a grating vector of the second super grating to provide both deflection and out coupling for two-dimensional output coupling.

19 Claims, 9 Drawing Sheets

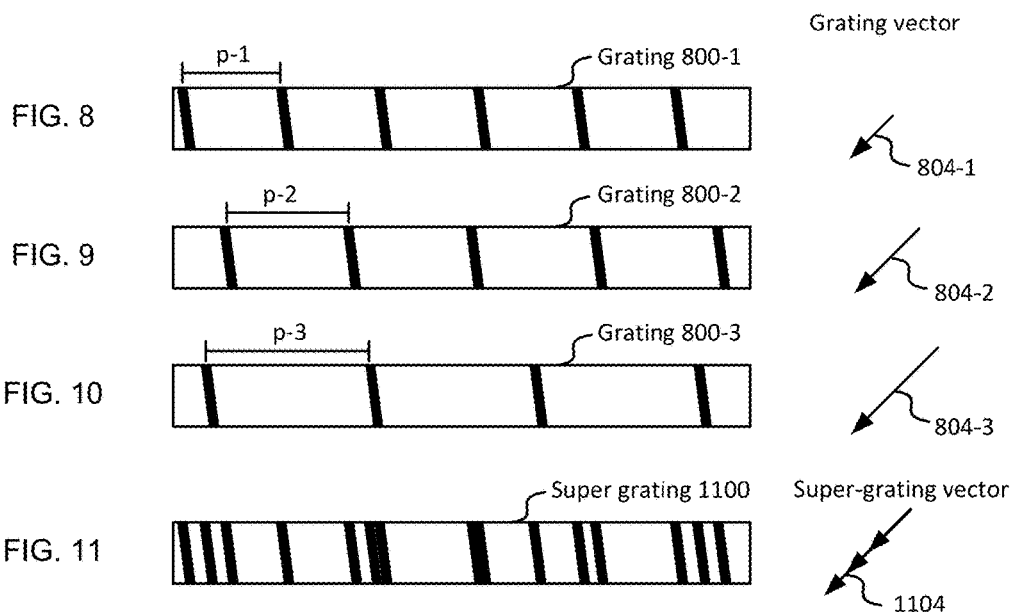
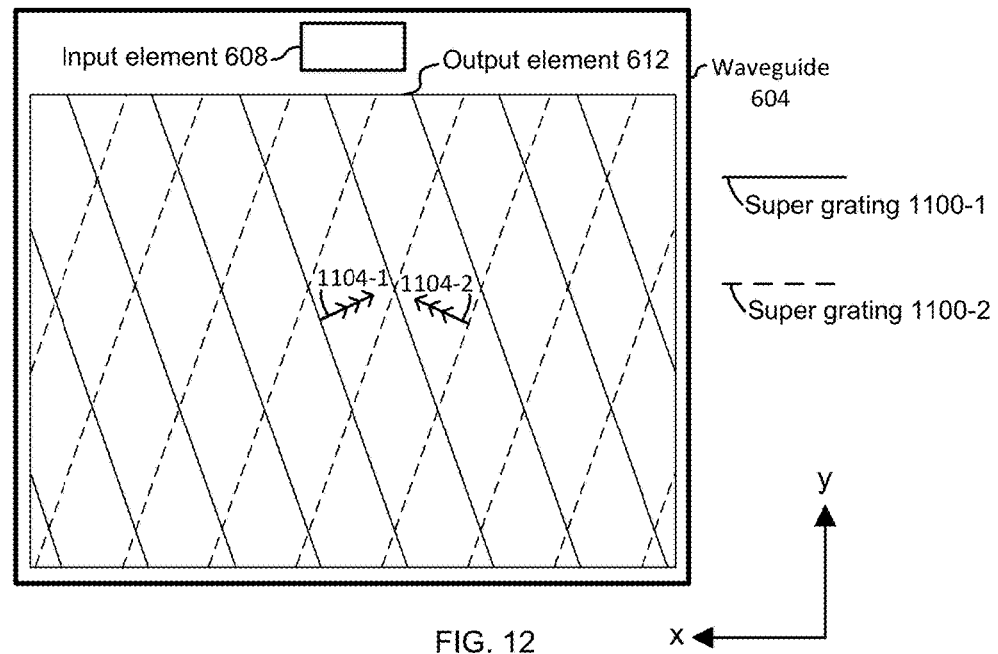

2D PUPIL EXPANDER USING HOLOGRAPHIC BRAGG GRATING

BACKGROUND

The disclosure relates generally to near-eye-display systems, and more specifically to waveguide displays with a small form factor, a large field of view, and/or a large eyebox. Near-eye, light-field displays project images directly into a user's eye, encompassing both near-eye displays and electronic viewfinders. Conventional near-eye displays generally have a display element that generates image light that passes through one or more lenses before reaching a user's eyes. Additionally, near-eye displays in virtual-reality (VR) systems and/or augmented-reality (AR) systems have design criteria to be compact, be light weight, and provide two-dimensional expansion with a large eyebox and a wide field-of-view (FOV). In typical near-eye displays, a limit for the FOV is based on satisfying two physical conditions: (1) an occurrence of total internal reflection of image light coupled into a waveguide, and (2) an existence of a first-order diffraction caused by a diffraction grating. Conventional methods used to satisfy the above two physical conditions rely on heavy and expensive components. Further, designing a conventional near-eye display with two-dimensional expansion involving two different output grating elements that are spatially separated often results in a large form factor. Accordingly, it is challenging to design near-eye displays using conventional methods to achieve a small form factor, a large FOV, and/or a large eyebox.

SUMMARY

This disclosure relates to an output coupler for an optical waveguide; more specifically, and without limitation, to a Bragg grating used as an output coupler for a waveguide in a lens used for augmented reality (AR). Some systems proposed for AR use different output couplers for different wavelengths of light for an AR display. For example, an AR display could have three waveguides and three corresponding surface-relief output couplers; one for red, one for green, and one for blue. Instead of using surface-relief gratings, this disclosure describes systems and/or methods for using Bragg gratings. One possible reason for using Bragg gratings is to reduce a number of waveguides and/or output couplers in an AR display. Instead of three waveguides and three output couplers for three different colors, one waveguide and one output coupler can be used to display three different colors.

In some embodiments, light is coupled into a waveguide in a lens using an input coupler (e.g., an index-matched prism). The lens is part of a head-mounted display (e.g., AR glasses). The waveguide supports an angle range of input light, which input light propagates in the waveguide by total internal reflection from the input coupler to an output coupler. The output coupler includes one, two, or more super gratings. A super grating is an optical device with two or more gratings written in the optical device. Light exits the waveguide and is transmitted toward a user's eye. In some embodiments, a super grating is formed by exposing an optical device (e.g., exposing a substrate multiple times using UV light) to form multiple Bragg gratings.

BRIEF DESCRIPTION OF THE DRAWINGS

Illustrative embodiments are described with reference to the following figures.

FIG. 8 is a simplified drawing of an embodiment of a Bragg grating defined by a first pitch.

FIG. 9 is a simplified drawing of another embodiment of a Bragg grating defined by a second pitch.

FIG. 10 is a simplified drawing of another embodiment of a Bragg grating defined by a third pitch.

FIG. 11 is a simplified drawing of an embodiment of a super grating.

FIG. 12 is a simplified drawing of an embodiment of an output element having a first super grating and a second super grating.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

Figure 1:
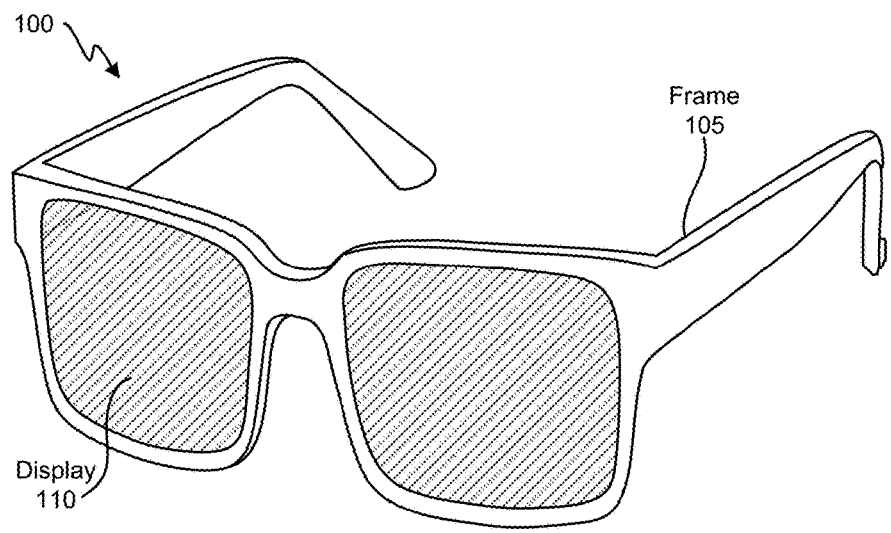
FIG. 1 is a diagram of an embodiment of a near-eye display.

FIG. 1 is a diagram of an embodiment of a near-eye display 100. The near-eye display 100 presents media to a user. Examples of media presented by the near-eye display 100 include one or more images, video, and/or audio. In some embodiments, audio is presented via an external device (e.g., speakers and/or headphones) that receives audio information from the near-eye display 100, a console, or both, and presents audio data based on the audio information. The near-eye display 100 is generally configured to operate as a virtual reality (VR) display. In some embodiments, the near-eye display 100 is modified to operate as an augmented reality (AR) display and/or a mixed reality (MR) display.

The near-eye display 100 includes a frame 105 and a display 110. The frame 105 is coupled to one or more optical elements. The display 110 is configured for the user to see content presented by the near-eye display 100. In some embodiments, the display 110 comprises a waveguide display assembly for directing light from one or more images to an eye of the user.

Figure 2:
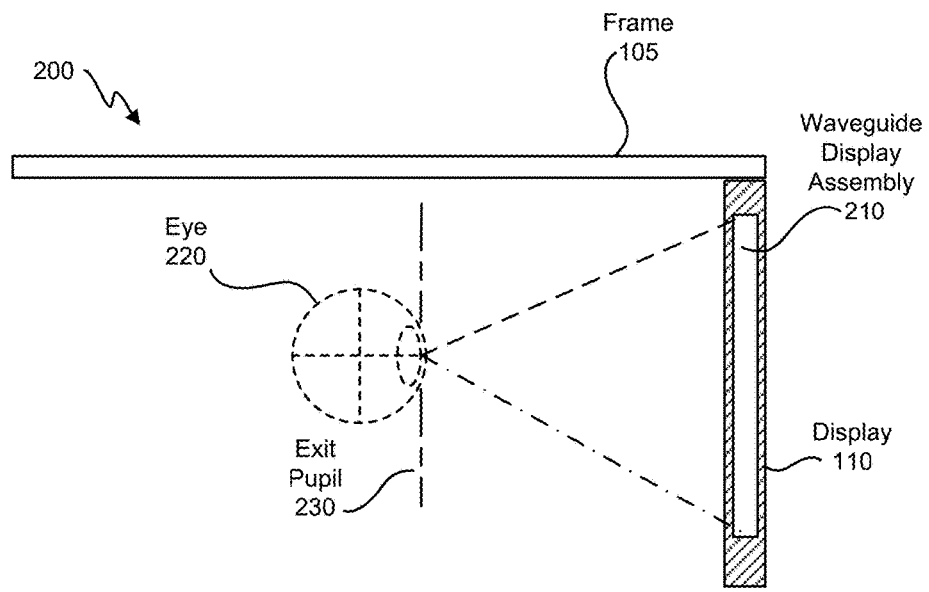
FIG. 2 is an embodiment of a cross section of the near-eye display.

FIG. 2 is an embodiment of a cross section 200 of the near-eye display 100 illustrated in FIG. 1. The display 110 includes at least one waveguide display assembly 210. An exit pupil 230 is a location where the eye 220 is positioned in an eyebox region when the user wears the near-eye display 100. For purposes of illustration, FIG. 2 shows the cross section 200 associated with a single eye 220 and a single waveguide display assembly 210, but a second waveguide display is used for a second eye of a user.

The waveguide display assembly 210 is configured to direct image light to an eyebox located at the exit pupil 230 and to the eye 220. The waveguide display assembly 210 may be composed of one or more materials (e.g., plastic, glass, etc.) with one or more refractive indices. In some embodiments, the near-eye display 100 includes one or more optical elements between the waveguide display assembly 210 and the eye 220.

In some embodiments, the waveguide display assembly 210 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g. multi-planar colored display). In some configurations, the stacked waveguide display is a monochromatic display that can be projected on multiple planes (e.g. multi-planar monochromatic display). The varifocal waveguide display is a display that can adjust a focal position of image light emitted from the waveguide display. In alternate embodiments, the waveguide display assembly 210 may include the stacked waveguide display and the varifocal waveguide display.

Figure 3:
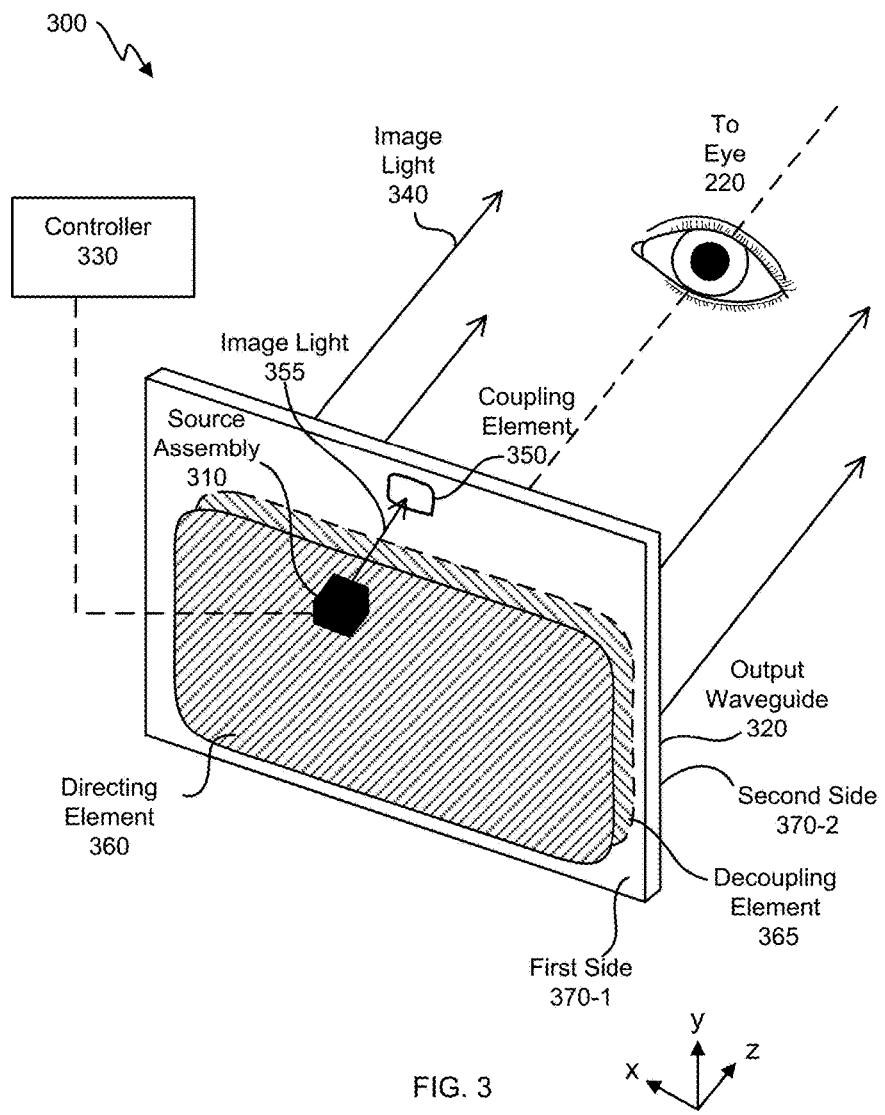
FIG. 3 illustrates an isometric view of an embodiment of a waveguide display with a single source assembly.

FIG. 3 illustrates an isometric view of an embodiment of a waveguide display 300. In some embodiments, the waveguide display 300 is a component (e.g., the waveguide display assembly 210) of the near-eye display 100. In some embodiments, the waveguide display 300 is part of some other near-eye display or other system that directs image light to a particular location.

The waveguide display 300 includes a source assembly 310, an output waveguide 320, and a controller 330. For purposes of illustration, FIG. 3 shows the waveguide display 300 associated with a single eye 220, but in some embodiments, another waveguide display separate, or partially separate, from the waveguide display 300 provides image light to another eye of the user.

The source assembly 310 generates image light 355. The source assembly 310 generates and outputs the image light 355 to a coupling element 350 located on a first side 370-1 of the output waveguide 320. The output waveguide 320 is an optical waveguide that outputs expanded image light 340 to an eye 220 of a user. The output waveguide 320 receives the image light 355 at one or more coupling elements 350 located on the first side 370-1 and guides received input image light 355 to a directing element 360. In some embodiments, the coupling element 350 couples the image light 355 from the source assembly 310 into the output waveguide 320. The coupling element 350 may be, e.g., a diffraction grating, a holographic grating, one or more cascaded reflectors, one or more prismatic surface elements, and/or an array of holographic reflectors.

The directing element 360 redirects the received input image light 355 to the decoupling element 365 such that the received input image light 355 is decoupled out of the output waveguide 320 via the decoupling element 365. The directing element 360 is part of, or affixed to, the first side 370-1 of the output waveguide 320. The decoupling element 365 is part of, or affixed to, the second side 370-2 of the output waveguide 320, such that the directing element 360 is opposed to the decoupling element 365. The directing element 360 and/or the decoupling element 365 may be, e.g., a diffraction grating, a holographic grating, one or more cascaded reflectors, one or more prismatic surface elements, and/or an array of holographic reflectors.

The second side 370-2 represents a plane along an x-dimension and a y-dimension. The output waveguide 320 may be composed of one or more materials that facilitate total internal reflection of the image light 355. The output waveguide 320 may be composed of e.g., silicon, plastic, glass, and/or polymers. The output waveguide 320 has a relatively small form factor. For example, the output waveguide 320 may be approximately 50 mm wide along x-dimension, 30 mm long along y-dimension and 0.5-1 mm thick along a z-dimension.

The controller 330 controls scanning operations of the source assembly 310. The controller 330 determines scanning instructions for the source assembly 310. In some embodiments, the output waveguide 320 outputs expanded image light 340 to the user's eye 220 with a large field of view (FOV). For example, the expanded image light 340 provided to the user's eye 220 with a diagonal FOV (in x and y) of 60 degrees and or greater and/or 150 degrees and/or less. The output waveguide 320 is configured to provide an eyebox with a length of 20 mm or greater and/or equal to or less than 50 mm; and/or a width of 10 mm or greater and/or equal to or less than 50 mm.

Figure 4:
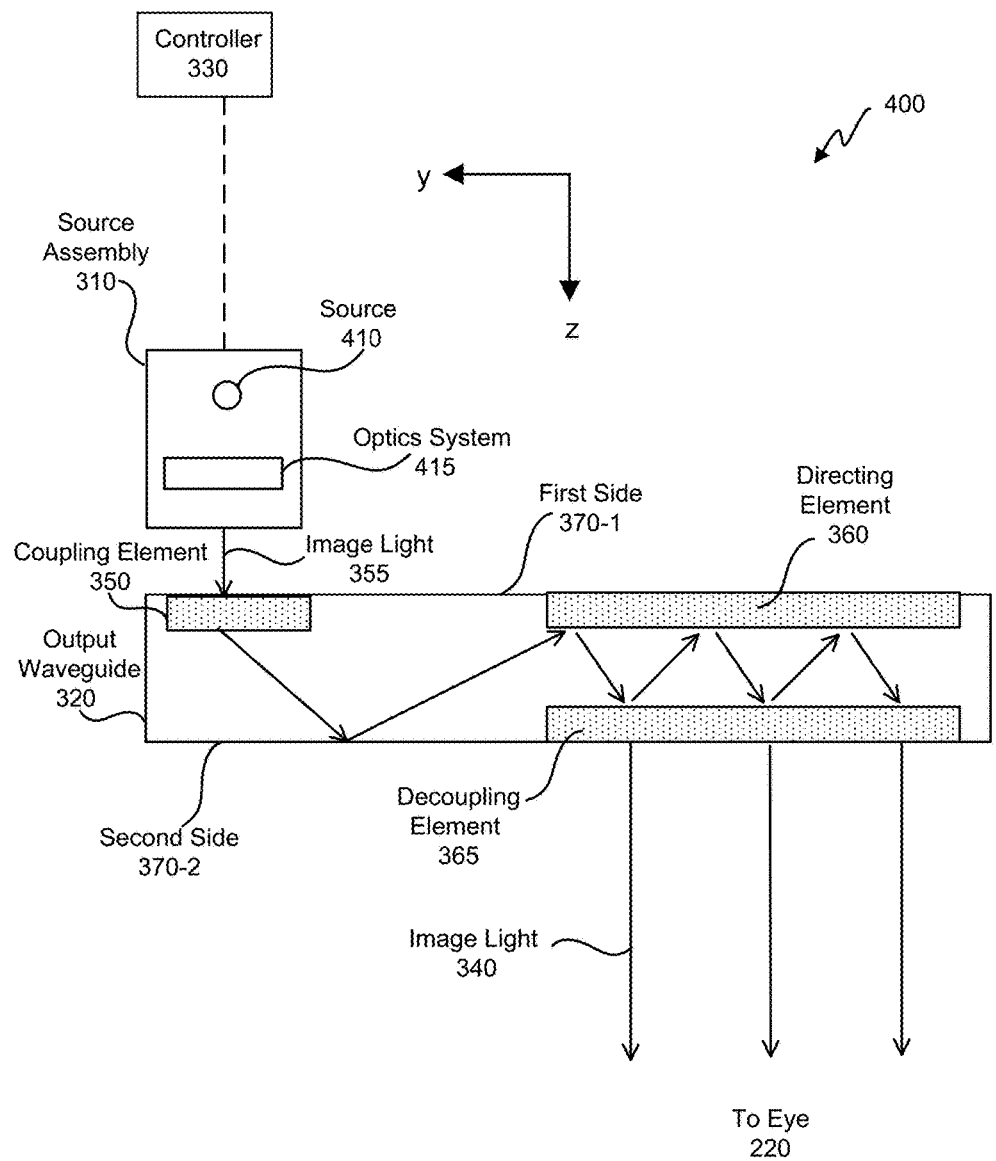
FIG. 4 illustrates a cross section of an embodiment of the waveguide display.

FIG. 4 illustrates an embodiment of a cross section 400 of the waveguide display 300. The cross section 400 includes the source assembly 310 and the output waveguide 320. The source assembly 310 generates image light 355 in accordance with scanning instructions from the controller 330. The source assembly 310 includes a source 410 and an optics system 415. The source 410 is a light source that generates coherent or partially coherent light. The source 410 may be, e.g., a laser diode, a vertical cavity surface emitting laser, and/or a light emitting diode.

The optics system 415 includes one or more optical components that condition the light from the source 410. Conditioning light from the source 410 may include, e.g., expanding, collimating, and/or adjusting orientation in accordance with instructions from the controller 330. The one or more optical components may include one or more lens, liquid lens, mirror, aperture, and/or grating. In some embodiments, the optics system 415 includes a liquid lens with a plurality of electrodes that allows scanning a beam of light with a threshold value of scanning angle to shift the beam of light to a region outside the liquid lens. Light emitted from the optics system 415 (and also the source assembly 310) is referred to as image light 355.

The output waveguide 320 receives the image light 355. The coupling element 350 couples the image light 355 from the source assembly 310 into the output waveguide 320. In embodiments where the coupling element 350 is diffraction grating, a pitch of the diffraction grating is chosen such that total internal reflection occurs in the output waveguide 320, and the image light 355 propagates internally in the output waveguide 320 (e.g., by total internal reflection), toward the decoupling element 365.

The directing element 360 redirects the image light 355 toward the decoupling element 365 for decoupling from the output waveguide 320. In embodiments where the directing element 360 is a diffraction grating, the pitch of the diffraction grating is chosen to cause incident image light 355 to exit the output waveguide 320 at angle(s) of inclination relative to a surface of the decoupling element 365.

In some embodiments, the directing element 360 and/or the decoupling element 365 are structurally similar. The expanded image light 340 exiting the output waveguide 320 is expanded along one or more dimensions (e.g., may be elongated along x-dimension). In some embodiments, the waveguide display 300 includes a plurality of source assemblies 310 and a plurality of output waveguides 320. Each of the source assemblies 310 emits a monochromatic image light of a specific band of wavelength corresponding to a primary color (e.g., red, green, or blue). Each of the output waveguides 320 may be stacked together with a distance of separation to output an expanded image light 340 that is multi-colored.

Figure 5:
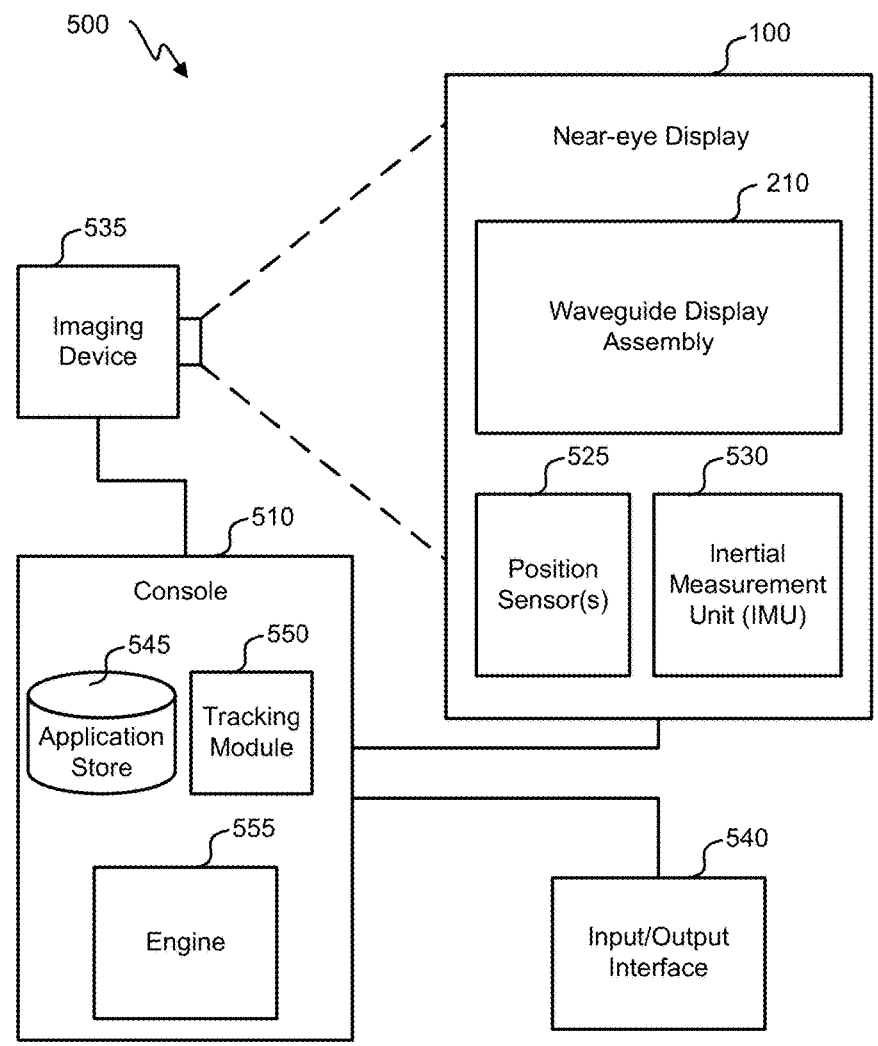
FIG. 5 is a block diagram of an embodiment of a system including the near-eye display.

FIG. 5 is a block diagram of an embodiment of a system 500 including the near-eye display 100. The system 500 comprises the near-eye display 100, an imaging device 535, and an input/output interface 540 that are each coupled to a console 510.

The near-eye display 100 is a display that presents media to a user. Examples of media presented by the near-eye display 100 include one or more images, video, and/or audio. In some embodiments, audio is presented via an external device (e.g., speakers and/or headphones) that receives audio information from the near-eye display 100 and/or the console 510 and presents audio data based on the audio information to a user. In some embodiments, the near-eye display 100 may also act as an AR eyewear glass. In some embodiments, the near-eye display 100 augments views of a physical, real-world environment, with computer-generated elements (e.g., images, video, sound, etc.).

The near-eye display 100 includes a waveguide display assembly 210, one or more position sensors 525, and/or an inertial measurement unit (IMU) 530. The waveguide display assembly 210 includes the source assembly 310, the output waveguide 320, and the controller 330.

The IMU 530 is an electronic device that generates fast calibration data indicating an estimated position of the near-eye display 100 relative to an initial position of the near-eye display 100 based on measurement signals received from one or more of the position sensors 525.

The imaging device 535 generates slow calibration data in accordance with calibration parameters received from the console 510. The imaging device 535 may include one or more cameras and/or one or more video cameras.

The input/output interface 540 is a device that allows a user to send action requests to the console 510. An action request is a request to perform a particular action. For example, an action request may be to start or end an application or to perform a particular action within the application.

The console 510 provides media to the near-eye display 100 for presentation to the user in accordance with information received from one or more of: the imaging device 535, the near-eye display 100, and the input/output interface 540. In the example shown in FIG. 5, the console 510 includes an application store 545, a tracking module 550, and an engine 555.

The application store 545 stores one or more applications for execution by the console 510. An application is a group of instructions, that when executed by a processor, generates content for presentation to the user. Examples of applications include: gaming applications, conferencing applications, video playback application, or other suitable applications.

The tracking module 550 calibrates the system 500 using one or more calibration parameters and may adjust one or more calibration parameters to reduce error in determination of the position of the near-eye display 100.

The tracking module 550 tracks movements of the near-eye display 100 using slow calibration information from the imaging device 535. The tracking module 550 also determines positions of a reference point of the near-eye display 100 using position information from the fast calibration information.

The engine 555 executes applications within the system 500 and receives position information, acceleration information, velocity information, and/or predicted future positions of the near-eye display 100 from the tracking module 550. In some embodiments, information received by the engine 555 may be used for producing a signal (e.g., display instructions) to the waveguide display assembly 210 that determines a type of content presented to the user.

Figure 6:
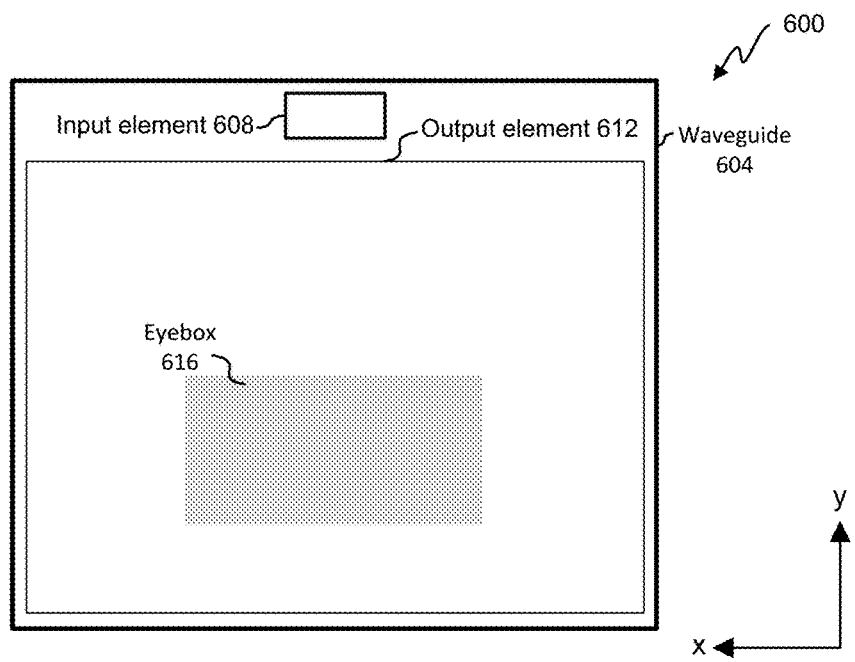
FIG. 6 is a simplified front view of an embodiment of a device having a waveguide with an input element and an output element.

FIG. 6 is a simplified front view of an embodiment of a device 600 having a waveguide 604, an input element 608, and an output element 612. The device 600 is part of a waveguide display assembly 210, which is part of a display 110 for an artificial-reality headset (e.g., display 110 mounted in frame 105 for a near-eye display 100). The waveguide 604 is configured to guide light from the input element 608 to the output element 612. In some embodiments, the waveguide 604 is an output waveguide 320. The input element 608 is configured to couple light from a source (e.g., from a source assembly 310) into the waveguide 604. The output element 612 is configured to out couple light from the waveguide 604 to an eyebox 616. While a user is wearing the artificial-reality headset, the eyebox 616 is configured to be positioned at an eye 220 of the user. In some embodiments, the input element 608 is similar to the coupling element 350. In some embodiments, the input element 608 comprises a prism and/or the output element 612 is a holographic grating.

Figure 7:
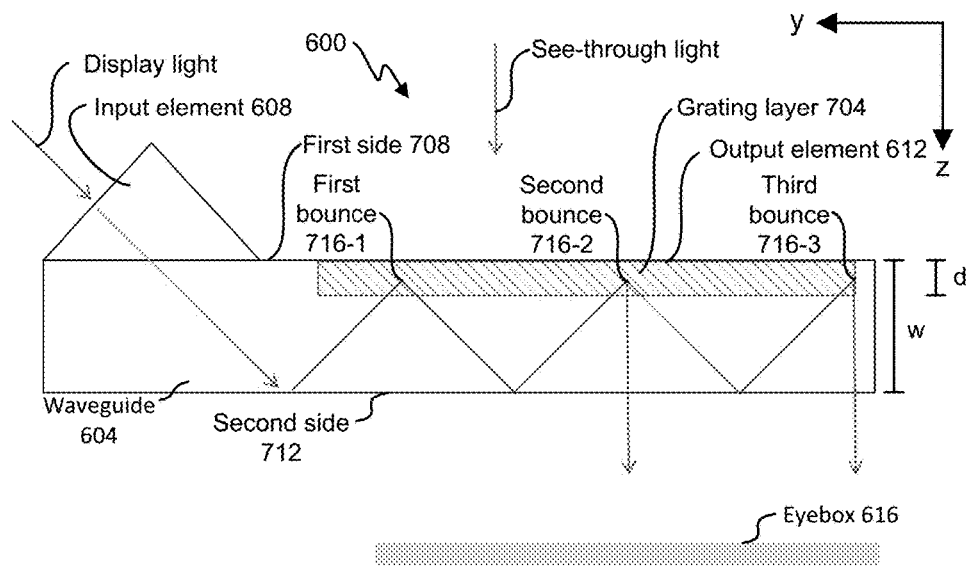
FIG. 7 is a simplified side view of an embodiment of a device having a waveguide with an input element and an output element.

FIG. 7 is a simplified side view of an embodiment of the device 600. The output element 612 comprises one grating layer 704. In some embodiments, the output element 612 comprises only one grating layer (e.g., instead of both a directing element 360 and a decoupling element 365). Two different super gratings are written in the grating layer 704 using multiple exposures. With multiplexed exposures, the waveguide 604 can decouple light, such as light of three bandwidths, Red-Green-Blue (RGB), wherein each bandwidth of light source is 30 nm+/−10% (e.g., at full width, half max) from field of view angles within the waveguide (e.g., angles 40-75 degrees), while providing small size and low weight. See-through quality can be good because Bragg conditions are for a display-light path (e.g. angularly selective for a display-light path) which will be different for see-through light.

The input element 608 is a prism for coupling light into the waveguide 604. Coupling through a prismatic element can be very efficient (e.g., transmission >90%) compared to using a grating element. The prism is index matched to the waveguide 604. In some embodiments the input element 608 is an angled side of the waveguide 604 (e.g., the waveguide 604 is cut to accommodate a larger beam) (not shown) and/or a grating.

Deflection and decoupling of light by the grating layer 704 is diffraction caused by the super gratings. In some examples, the decoupled light may be from first order diffractions. The super gratings are Bragg gratings. Bragg gratings can be formed in many ways. In some embodiments, a grating is formed using one or more of the following: exposing material (e.g., a portion of the cladding and/or core of the waveguide 604) to electro-magnetic radiation (e.g., ultra-violet (UV) light); stacking materials having different refractive indices (e.g., thin films), using resins having different refractive indices, using ion-implantation to change refractive index of a material, and/or exposing material to a thermal gradient. The waveguide 604 is partially exposed in a transverse direction of the waveguide, so that the Bragg grating does not extend across an entire core of the waveguide 604. A transverse width w of the waveguide 604 is measured from a first side 708 of the waveguide 604 to a second side 712 of the waveguide 604. The grating layer 704 has a depth d measured from the first side 708 toward the second side 712. Depth d is equal to or greater than 5%, 10%, or 15% of width w and equal to or less than 80%, 50%, 40% or 30% of width w. In some embodiments, super gratings (discussed below) are formed on the same side of the waveguide 604 (e.g., on the first side 708). In some embodiments a first super grating is formed near one side (e.g., the first side 708) of the waveguide 604 and a second super grating is formed near another side (e.g., the second side 712) of the waveguide 604. In some embodiments, the grating layer 704 is added to the waveguide 604 (e.g., formed in a material layer outside the waveguide 604 and then bonded to the first side 708 of the waveguide 604).

In the embodiment shown, light diffracts from the grating 704 at a first bounce 716-1, at a second bounce 716-2, and at a third bounce 716-3. Light is coupled out of the waveguide at the second bounce 716-2 (e.g., some light at the first bounce 716-1 being deflected for decoupling on the second bounce 716-2), the third bounce 716-3 (e.g., some light at the second bounce 716-2 being deflected for decoupling on the third bounce 716-3), and so on.

The output element 612 comprises a holographic Bragg grating. Holographic Bragg gratings are discussed in U.S. patent application Ser. No. 15/864,859, filed on Jan. 8, 2018, titled "Volume Bragg Grating for Waveguide Display," which is incorporated by reference for all purposes. The output element 612 is formed by multiple exposures to form two super gratings that: (1) deflect light coupled by the input element 608; and (2) decouple light that is deflected. In some embodiments, deflection and/or decoupling is first order diffraction.

FIG. 8 is a simplified drawing of an embodiment of a first grating 800-1. The first grating 800-1 is a Bragg grating. A Bragg grating has alternating regions of lower refractive index and higher refractive index. The first grating 800-1 is periodic, defined by a pitch p-1. The pitch is from the grating equation: $p*\sin(\theta_m - \theta_i) = m*\lambda$, where p is the pitch (also known as the grating constant), $\theta_m$ is the diffracted angle, $\theta_i$ is the incident angle, m is the order, and $\lambda$ is the wavelength of diffracted light. The first grating 800-1 is defined by a first grating vector 804-1, which has an orientation in a direction of change of light direction (e.g., slant), which the grating 800-1 imparts to an incident light beam, and a length proportional to the pitch p.

FIG. 9 is a simplified drawing of an embodiment of a second grating 800-2. The second grating 800-2 is similar to the first grating 800-1 except the second grating 800-2 is defined by a second pitch p-2, which is longer than p-1 and defined by a second grating vector 804-2, which is longer than the first grating vector 804-1.

FIG. 10 is a simplified drawing of an embodiment of a third grating 800-3. The third grating 800-3 is similar to the second grating 800-2 except the third grating 800-3 is defined by a third pitch p-3, which is longer than the second pitch p-2 and defined by a third grating vector 804-3, which is longer than the second grating vector 804-2.

FIG. 11 is a simplified drawing of an embodiment of a super grating 1100. The super grating 1100 is a combination of gratings 800 that have grating vectors 804 oriented in a same direction. The super grating 1100 is formed by exposing the waveguide 604 multiple times to UV light. The super grating 1100 is defined by super-grating vector 1104. In some embodiments, the super grating 1100 is a combination of n number of gratings 800, wherein n is equal to or greater than 10, 100, 500, or 600 and equal to or less than 1000, 2500, or 5000 (e.g., n=50, 100, 500, 1000, 2000, or 3000).

FIG. 12 is a simplified drawing of an embodiment an output element 612 having a first super grating 1100-1 and a second super grating 1100-2. A first super-grating vector 1104-1 defines the first super grating 1100-1. A second super-grating vector 1104-2 defines the second super grating 1100-2. The first super grating 1100-1 is offset from the second super grating 1100-2 (e.g., the first super-grating vector 1104-1 is skew to the second super-grating vector 1104-2). In some embodiments, both the first super grating 1100-1 and the second super grating 1100-2 are written in the same layer and/or written at the same time (e.g., two exposures at a time to form two Bragg gratings at a time; one Bragg grating in each super grating 1100). By having two super gratings that are oriented skew to one another, light of two dimensions can be out coupled by the output element 612 (e.g., by using two bounces from the output element 612).

The first super grating 1100-1 and the second super grating 1100-2 can be written in the same medium (e.g., holographic medium) on one side (e.g., as opposed to surface-relief gratings written on two sides of the waveguide 604). Thus, in some embodiments, the first super grating 1100-1, the second super grating 1100-2, and/or other super gratings 1100 are in the same optical medium and on the same side of the optical medium. In some embodiments, the first super grating 1100-1 is written on one side (e.g., the first side 708) and the second super grating 1100-2 is written on another side (e.g., the second side 712), so that the first super grating 1100-1 is separated in the z direction from the second super grating 1100-2.

Figure 13:
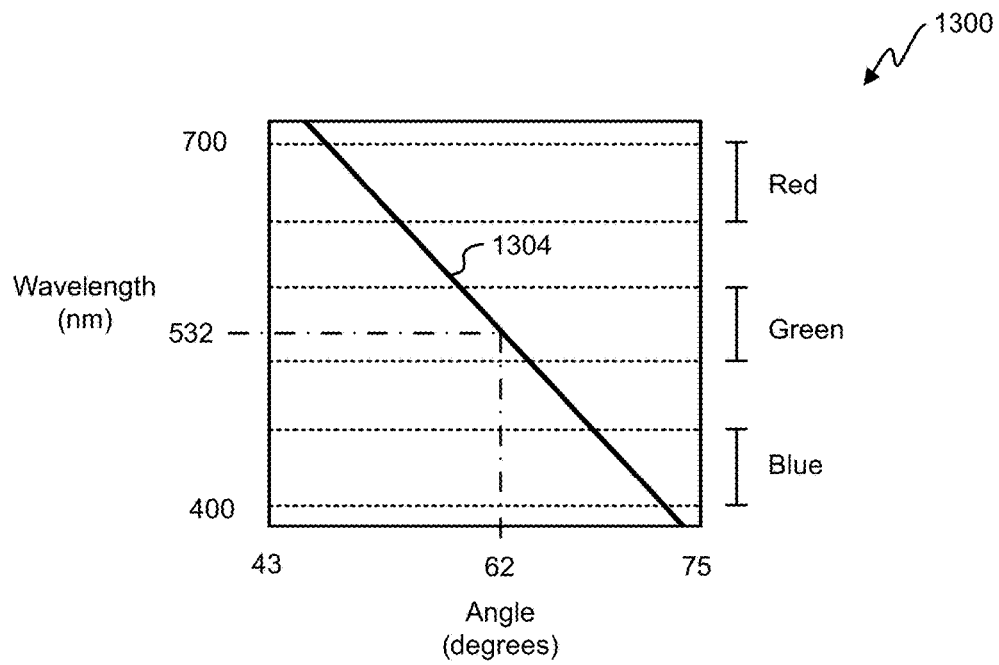
FIG. 13 is an embodiment of a solution space for a grating.

FIG. 13 is an embodiment of a solution space 1300 for a grating 800. As described in the '859 application, a Bragg grating diffracts light at a certain wavelength and angle. For example, the grating 800, for which the solution space 1300 is depicted in FIG. 13, diffracts green light (e.g., 532 nm) at an incoming angle of 62 degrees. A solution line 1304 shows angle and wavelength combinations that one grating 800 diffracts.

Figure 14:
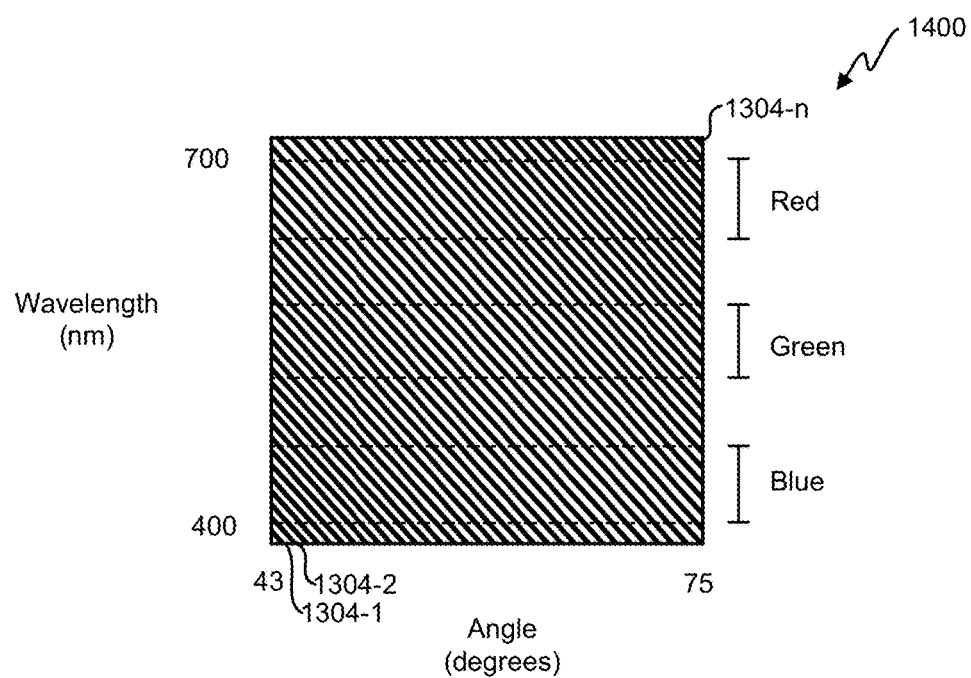
FIG. 14 is an embodiment of a solution space for a super grating with dense writing of Bragg gratings.

FIG. 14 is an embodiment of a solution space 1400 for a super grating 1100 with dense writings of gratings 800. The solution space 1400 is made up of n solution lines 1304, each solution line 1304 corresponding to one grating 800. FIG. 14 shows a first solution line 1304-1, a second solution line 1304-2, to solution line 1304-n.

Multiple exposures (e.g., UV exposures) are performed to create n number of gratings 800 with grating vectors 804 in the same direction but different lengths (e.g., same slant but different pitches). Exposures are done densely so that neighboring incident angles are separated by less than 1, 2, or 3 arcminutes and/or by more than 0.1 arcminute. Thus for basically all angles (e.g., between 40 and 75 degrees), there is a Bragg condition for a spectrum of light (e.g., from 400 nm to 700 nm or bands of light such as from 450-490 nm, 520-560 nm, and 635-700 nm). Supported incidence cone angles include angles of light coming from the input element 608 as well as an angle of the in coupled light followed by deflection (e.g., first diffraction of the output element 612). The output element 612 supports both deflection and outcoupling of a field of view (FOV) and spectrum of light. In some embodiments n=a number of pixels of the display +/−10%. Thus for a 2000 pixel display, n=2000+/−10%. With multiplexed exposures, one waveguide display can decouple light of the RGB spectrum (e.g., RGB bands having 30-nm bandwidth, +/−5 or 10%) from a range of angles.

In some embodiments, sparse writing is used in combination with broadband light to reduce a number of gratings 800 in a super grating 1100. At a given location for a super grating 1100 there are a first number of gratings g1 that diffract red light, a second number of gratings g2 that diffract green light, and a third number of gratings g3 that diffract blue light. In some embodiments, one grating can diffract red light, green light, and blue light, thus g1+g2+g3 can be less than a total number of gratings n for a super grating 1100. For sparse writing, g1, g2, and/or g3 are equal to or greater than 1, 5, 10, 15, or 20 and equal to or less than 20, 30, 50, or 100. In some embodiments, the total number of gratings n for a super grating 1100 at a given location is equal to or greater than 15, 20, or 30 and equal to or less than 30, 50, 100, 300, or 500. In some embodiments, red light has a wavelength equal to or between 620 and 750 nm; green light has a wavelength equal to or between 495 and 570 nm; and blue light has a wavelength equal to or between 450 and 495 nm.

Decoupling efficiency of a super grating 1100 can vary depending if gratings 800 are written sparsely or densely. For sparse writings, decoupling efficiency at a given location (e.g., at the second bounce 716-2 and/or at the third bounce 716-3) can be equal to or greater than 85, 90, 95, 98, or 100%. Decoupling efficiency can be high because gratings at different locations out couple different wavelengths of light for a given input angle. For dense writing, decoupling efficiency can be less than 50% at a given location (e.g., between 5% and 30%; at the second bounce 716-2 and/or at the third bounce 716-3). In some embodiments, decoupling efficiency increases as light propagates through the waveguide 604. Sparse gratings may be configured to have high decoupling efficiency for narrower bands (e.g. smaller than 50 nm), while dense gratings may be configured to have a changing decoupling efficiency for a broader bands (e.g. greater than 50 nm).

Figure 15:
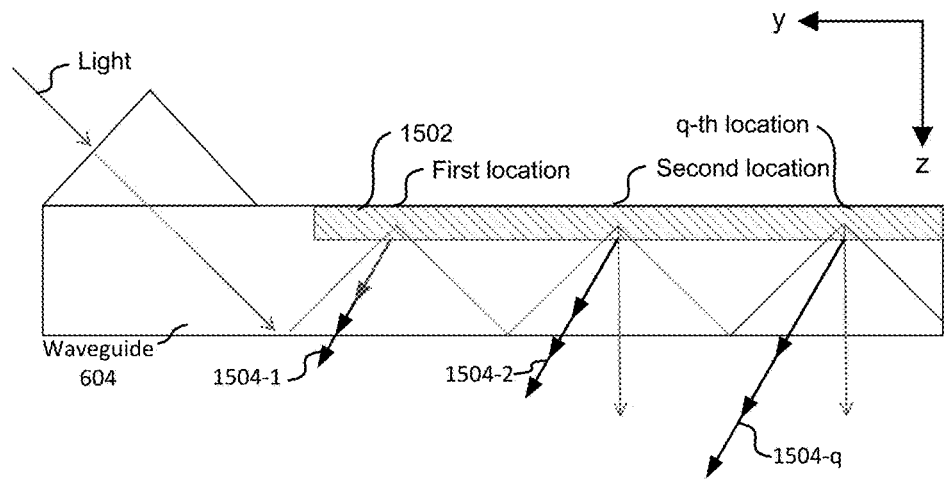
FIG. 15 is an embodiment of an output element having a super grating that varies spatially.

FIG. 15 is an embodiment of an output element 612 having a super grating 1502. The super grating 1502 varies spatially. The super grating 1502 comprises a plurality of gratings. The plurality of gratings are oriented in the same direction. Each of the plurality of gratings varies spatially so that the super grating 1502 has different sets of pitches at different locations. In some embodiments, the super grating 1502 is formed by superimposing a plurality of chirped gratings. The super grating 1502 can be formed by coarse exposures. In this way, for a given incidence angle with broad spectrum of light, some wavelengths will diffract (deflect or decouple) from a first bounce at a first location and other wavelengths, which were not yet diffracted, are diffracted at a second location after a second bounce, and other sets of wavelengths are diffracted at other locations, and so on until the q-th location. Thus light in the spectrum will eventually be diffracted after a few bounces in the waveguide (e.g., q=4, 5, or 6). Dense exposures are thus not needed at each location (e.g., instead of 1,000 exposures, less than 100 exposures can be used at a given location). Gratings at the second location don't have the same pitches as gratings at the first location. Thus a first super-grating vector 1504-1 at the first location is different from a second super-grating vector 1504-2 at the second location and different from a q-th super-grating vector 1504-q at the q-th location. The first super-grating vector 1504-1, the second super-grating vector 1504-2, and the q-th super grating vector 1504-q have the same direction and different magnitudes. The first super-grating vector 1504-1, the second super-grating vector 1504-2, and the q-th super grating vector 1504-q have different magnitudes because pitches of the plurality of gratings vary as a function of location. A second super grating can be used with gratings oriented in a different direction to couple light out of the waveguide 604 in two dimensions. The second super grating can also have spatially-varying pitch.

Figure 16:
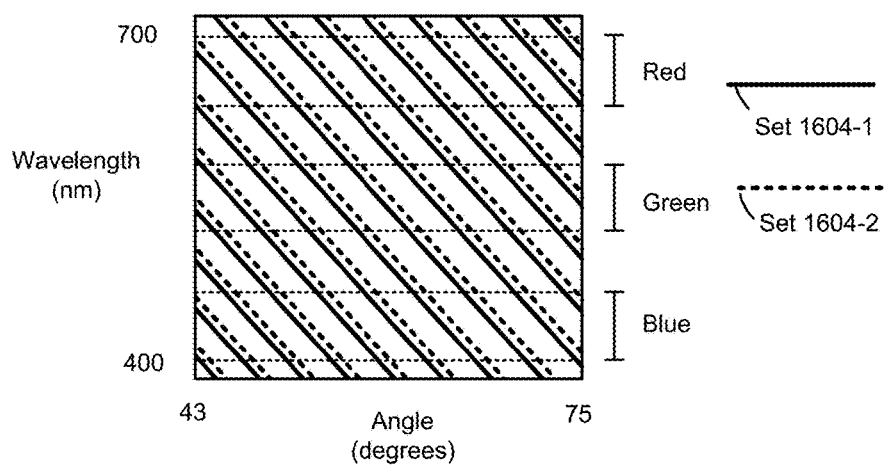
FIG. 16 is an embodiment of a solution space for a super grating having spatially-varying pitches.

FIG. 16 is an embodiment of a solution space 1600 for a super grating 1502 having a plurality of gratings that vary spatially. A first set 1604-1 of solutions are shown in solid lines. A second set 1604-2 of solutions are shown in dashed lines. The first set 1604-1 of solutions are solution lines 1304 for the plurality of gratings at the first location. The second set 1604-2 of solutions are solution lines 1304 for the plurality of gratings at the second location. The first set 1604-1 of solutions are different than the second set 1604-2 of solutions. In some embodiments, a third set, a fourth set, and/or a fifth set of solutions exist for a third location, a fourth location, and/or a fifth location. Applicant has determined by simulation that five locations can be sufficient to out couple a spectrum of light from 400 nm to 700 nm.

Figure 17:
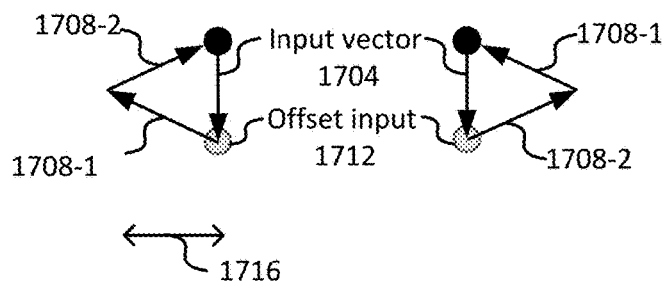
FIG. 17 is a simplified drawing of vector paths of light interacting with gratings of the output element.

FIG. 17 is a simplified drawing of vector paths of light interacting with gratings 800 of the output element 612. Light is coupled into the waveguide 604 by the input element 608. In some embodiments, the input element 608 imparts a direction change to light as depicted by input vector 1704 (e.g., by an input grating). Diffraction, either directing or decoupling, from a first grating is depicted by a first grating vector 1708-1. Diffraction, either directing or decoupling, from a second grating is depicted by a second grating vector 1708-2. After light is changed direction by the input element 608, diffracted by the first grating, and diffracted by the second grating after the first grating, the light has a direction (e.g., k vector or wave vector) similar to a direction of light entering into the input element 608 (see vectors on a left side of the figure). Light that is changed direction by the input element 608, diffracted by the second grating, and diffracted by the first grating after being diffracted by the second grating also has a direction (e.g., k vector or wave vector) similar to light entering the input element 608 (see vectors on a right side of the figure). The first grating vector 1708-1 and the second grating vector 1708-2 sum to zero when projected onto axis 1716.

In some embodiments, the input element 608 doesn't change direction of light; light is input at a calculated offset angle (e.g., input at offset input 1712), so that light will diffract out of the waveguide in a direction as if the input element 608 had changed direction of the light by an amount of the input vector 1704. In some embodiments, a combination of an offset angle and using the input element 608 to change the direction of light is equivalent to changing light by an amount equal to the input vector 1704. In some embodiments, light is coupled into a waveguide (e.g., waveguide 604) at a known offset angle (e.g., because waveguides are canted) and grating vectors 1708 are calculated so that input angle is different than output angle.

Figure 18:
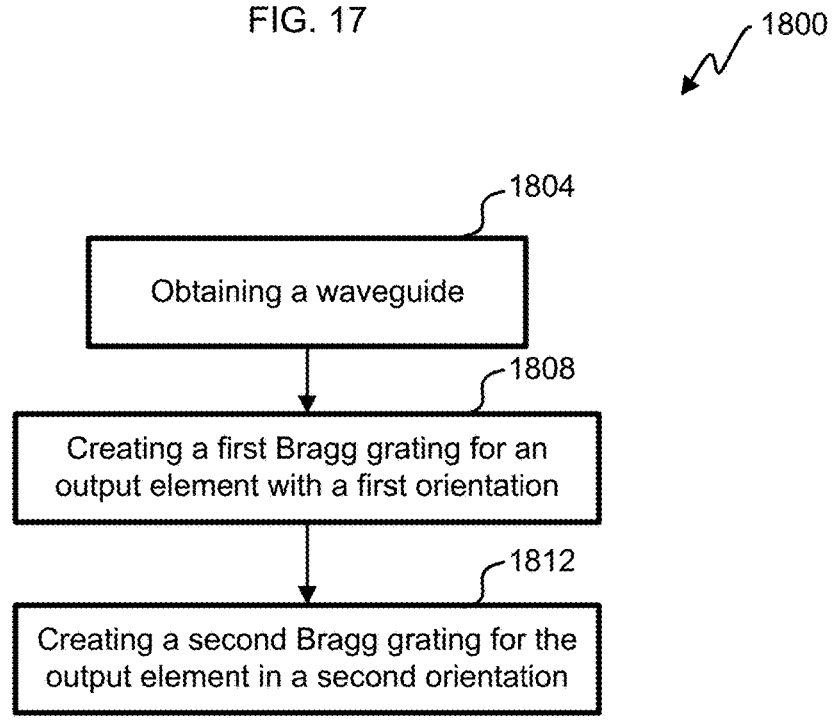
FIG. 18 illustrates an embodiment of a flowchart of a process for fabricating an output element.

FIG. 18 an embodiment of a flowchart of a process 1800 for fabricating an output element. Process 1800 begins in step 1804 with obtaining a waveguide (e.g., waveguide 604). In step 1808 a first Bragg grating (e.g., a grating of the first super grating 1100-1) is created (e.g., by UV exposure to a grating layer). The first Bragg grating has a first orientation (e.g., orientation of the first super-grating vector 1104-1). In step 1812 a second Bragg grating (e.g., a grating of the second super grating 1100-2) is created (e.g., by UV exposure to the grating layer). The second Bragg grating has a second orientation (e.g., orientation of the second super-grating vector 1104-2). The first Bragg grating and the second Bragg grating are part of the output element 612. The first super grating spatially overlaps with the second super grating. In some embodiments, the first super grating is spatially separate from the second super grating.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:
1. A device comprising:
  a waveguide configured to guide light from an input element to an output element;
  the input element is configured to couple light from a source into the waveguide; and
  the output element is configured to out couple light from the waveguide, wherein:
    the output element comprises a first super grating;
    the first super grating comprises a first plurality of gratings;
    each grating of the first plurality of gratings is defined by a grating vector;
    grating vectors of the first plurality of gratings are oriented in a first direction;
    the output element comprises a second super grating;
    the second super grating comprises a second plurality of gratings;

each grating of the second plurality of gratings is defined by a grating vector;
grating vectors of the second plurality of gratings are oriented in a second direction; and
the first direction is different from the second direction to out couple light from the waveguide.

2. The device of claim 1, wherein the first super grating is in a grating layer and the second super grating is in the grating layer, such that the first super grating is superimposed with the second super grating.

3. The device of claim 1, wherein the input element is a prism.

4. The device of claim 1, wherein the first plurality of gratings and the second plurality of gratings are Bragg gratings.

5. The device of claim 1, wherein:
the device further comprises a frame configured to support a display for an artificial-reality system, and
the waveguide is part of the display for the artificial-reality system.

6. The device of claim 1, wherein at least one grating of the first plurality of gratings diffracts red light, at least one grating of the first plurality of gratings diffracts green light, and at least one grating of the first plurality of gratings diffracts blue light.

7. The device of claim 1, wherein a grating vector of the first plurality of gratings plus a grating vector of the second plurality of gratings sum to zero when projected onto an axis.

8. The device of claim 1, wherein the first plurality of gratings comprises:
gratings defined by a first set of pitches at a first location, and
gratings defined by a second set of pitches a second location.

9. The device of claim 1, wherein the first plurality of gratings comprises more than 600 gratings and less than 5000 gratings.

10. A method comprising:
obtaining a waveguide;
exposing the waveguide to electromagnetic radiation to create a first plurality of gratings of an output element, wherein:
the first plurality of gratings are defined by grating vectors, and
the grating vectors of the first plurality of gratings have an orientation in a first direction; and
exposing the waveguide to electromagnetic radiation to create a second plurality of gratings of the output element, wherein:
the second plurality of gratings are defined by grating vectors, and
the grating vectors of the second plurality of gratings have an orientation in a second direction, different from the first direction.

11. The method of claim 10, further comprising:
exposing a first location of the waveguide to form the first plurality of gratings to have a first set of pitches; and
exposing a second location of the waveguide to form the first plurality of gratings to have a second set of pitches at the second location.

12. The method of claim 10, wherein the first plurality of gratings is formed by exposing the waveguide a number of times to electromagnetic radiation, and the number is 2000, +/−10%.

13. The method of claim 10, further comprising forming a prism on the waveguide for an input element.

14. The method of claim 10, further comprising:
exposing the waveguide to electromagnetic radiation to create a first set of gratings at a first location; and
exposing the waveguide to electromagnetic radiation to create a second set of gratings at a second location, wherein:
the first grating is part of the first set of gratings;
the first set of gratings and the second set of gratings have grating vectors in a direction of the first direction;
at the first location, the first set of gratings includes at least one grating for diffracting red light, at least one grating for diffracting green light, and at least one grating for diffracting blue light; and
at the second location the second set of gratings includes at least one grating for diffracting red light, at least one grating for diffracting green light, and at least one grating for diffracting blue light.

15. The method of claim 10, wherein the electromagnetic radiation is ultra violet (UV) light.

16. A device comprising:
a waveguide configured to guide light from an input element to an output element;
the input element is configured to couple light from a source into the waveguide; and
the output element is configured to out couple light from the waveguide, the output element comprising a super grating, wherein:
the super grating comprises a plurality of gratings;
the plurality of gratings are oriented in the same direction; and
each grating of the plurality of gratings varies spatially so that the super grating has a first set of pitches at a first location and a second set of pitches at a second location.

17. The device as recited in claim 16, wherein:
the super grating is a first super grating;
the device comprises a second super grating; and
gratings in the second super grating are oriented in a different direction than the plurality of gratings in the first super grating.

18. The device as recited in claim 17, wherein the first super grating and the second super grating are configured to out couple light from the waveguide in two dimensions.

19. The device as recited in claim 17, wherein:
the plurality of gratings of the first super grating are Bragg gratings; and
gratings of the second super grating are Bragg gratings.

* * * * *